United States Patent

Parry

[15] 3,684,827

[45] Aug. 15, 1972

[54] KEYBOARD

[72] Inventor: Walter E. Parry, La Grangeville, N.Y.

[73] Assignee: International Business Machines Corporation, Armonk, N.Y.

[22] Filed: June 23, 1970

[21] Appl. No.: 48,960

[52] U.S. Cl. ....................... 178/17 C, 178/81, 200/5, 340/365

[51] Int. Cl. ............................................ H04l 15/12

[58] Field of Search .... 178/81, 102, 110, 17 A, 17 C, 178/17 D; 340/365; 200/5 R, 5 D, 5 E, 169 AB

[56] References Cited

UNITED STATES PATENTS

| | | | |
|---|---|---|---|
| 3,439,118 | 4/1969 | Howard et al. | 340/365 |
| 3,193,629 | 7/1965 | Losch et al. | 200/5 R |
| 3,210,484 | 10/1965 | Dorsey | 340/365 |
| 2,939,758 | 6/1960 | Crosman | 178/17 C |
| 3,119,996 | 1/1964 | Comstock | 178/81 |

*Primary Examiner*—Kathleen H. Claffy
*Assistant Examiner*—William A. Helvestine
*Attorney*—Hanifin and Jancin and Owen L. Lamb

[57] ABSTRACT

A printed circuit keyboard in which a printed circuit card carries character encoding. Interposers are constructed with projecting fingers made of conductive polyvinyl chloride (PVC) material. Actuation of a key initiates a mechanical operation which moves the fingers against copper areas of a circuit card. The contact between the interposer fingers and the circuit card completes a current to a semiconductor sensing circuit. The motion of the interposer fingers against the circuit card plus the finger configuration, causes a wiping action which cleans the contact surface. Since the fingers are made of semi-hard PVC material, wear is kept to a minimum while at the same time a positive contact is maintained by the spring pressure of the material against the circuit card. Shifting between upper and lower case is accomplished by physically shifting the circuit card so that a new and differently encoded path is completed by the interposer.

19 Claims, 10 Drawing Figures

INVENTOR
WALTER E. PARRY

BY Owen Lamb
ATTORNEY

KEYBOARD

BACKGROUND OF THE INVENTION

The invention relates to improvements in encoding keyboards and more particularly to keyboards in which alphabetical and numerical data are transmitted through a number of electrical conductors which are energized in accordance with a code upon the depression of a key.

Prior art devices have utilized a cross-point switch mechanism in which the depressing of a key causes a grounding wire to be brought into contact with a wiping motion against a printed circuit board. This type of apparatus has the disadvantage that metal contacting the copper plating of the circuit board tends to wear the circuitry away in a brief period of time.

Other printed circuit card keyboards have various conductors located thereon such that when a key is depressed a shorting bar attached to the key bridges selected conductors to cause a unique code to be generated corresponding to the key depressed. This has the disadvantage that the shorting bars tend to get dirty and there is no self-cleaning wiping action to clean the contacts. The device has the further disadvantage that the size of the shorting bars is limited to the space between keys and therefore, the size of the code utilized is limited.

SUMMARY OF THE INVENTION

It is an object of this invention to provide an improved keyboard which provides an encoded output.

It is an object to provide an encoding keyboard in which upper and lower case symbols are easily generated.

It is an object of this invention to provide a keyboard which can be operated in the static or dynamic mode of operation.

It is a further object of this invention to provide an encoding keyboard which eliminates contact bounce.

It is a further object of this invention to provide an encoding keyboard in which the format of the code can be modified by field installation.

It is also an object of this invention to provide a keyboard in which the alpha-numeric/function key physical layout is modular in organization and not restrictive as to location.

The above objects are accomplished in accordance with the invention by providing a printed circuit card having a plurality of parallel conducting paths each representing one bit of a permutation code. A plurality of interposers are provided each one of which is actuatable by a key. Each interposer is provided with flexible projecting fingers constructed of conductive polyvinyl chloride (PVC) material. There is one finger for each permutation code output. When depressed, the key initiates a mechanical action which forces the interposer and hence the fingers into contact with copper conductive area paths on the printed circuit card. Selected ones of said paths are connected to corresponding permutation code wires to thereby cause a circuit path to be completed between said interposer finger and said conductive wire in accordance with the permutation code unique to the key depressed.

The invention has the advantage that it is modular in construction in that all interposers are identical in shape. Since the interposers are provided in parallel, they can be added or deleted depending upon the number of keys desired. Therefore, any number of keys can be provided in the horizontal direction.

In the vertical direction, a key can be placed anywhere along the length of the interposer and still initiate the action which forces the interposer into contact with the encoding board. Therefore, the location of the key is not restricted and a key can be placed anywhere on the vertical or horizontal direction and the encoding card made up accordingly.

The keyboard is economical to manufacture because all interposers and all key levers are identical and modular in organization.

IN THE DRAWINGS

GENERAL DESCRIPTION

Figure 1:
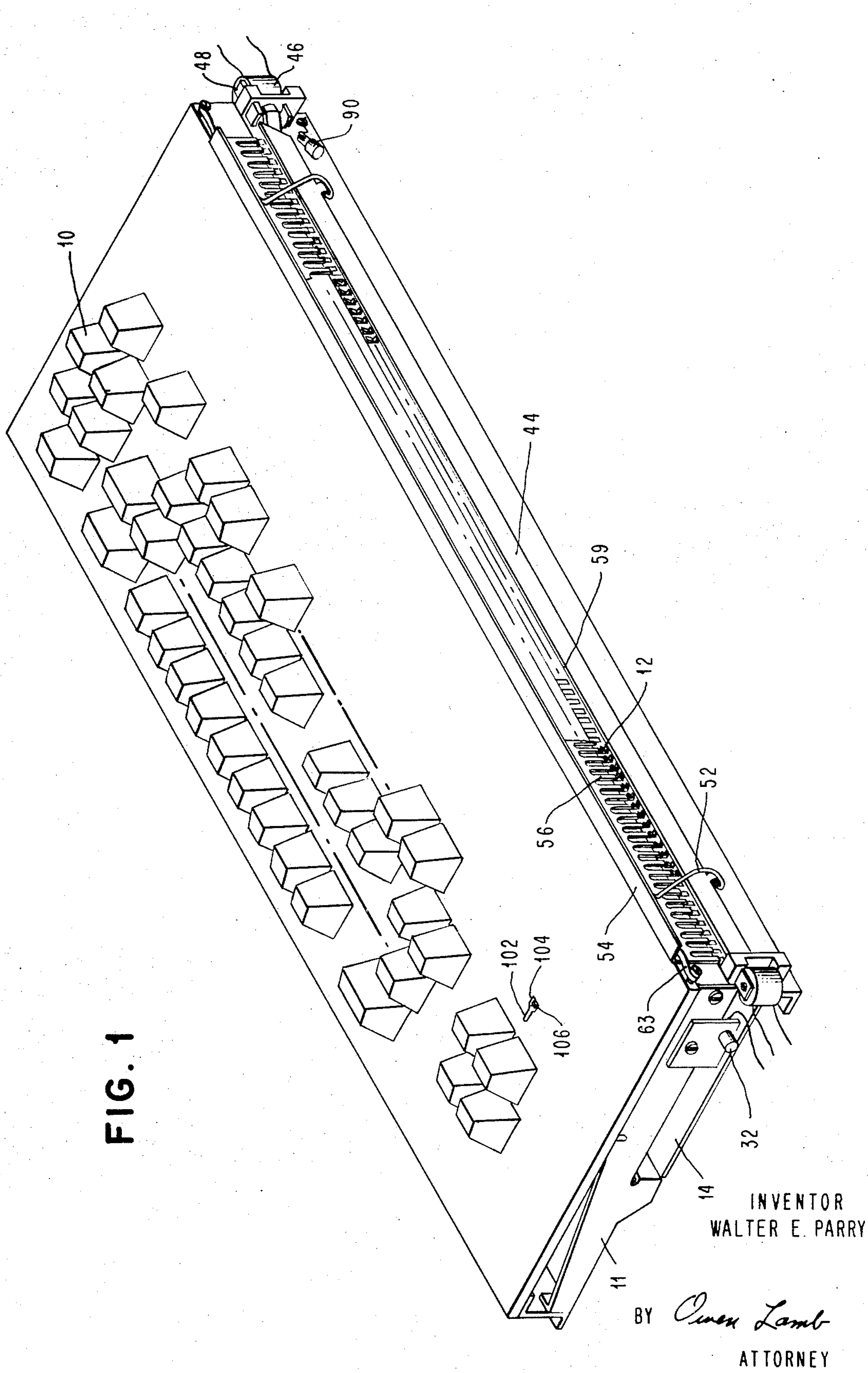
FIG. 1 is a perspective view of the keyboard assembly embodying the invention.

Referring to FIG. 1, the keyboard includes a plurality of mechanical keys 10, a plurality of interposers 12 (more clearly shown in FIG. 2), an encoding card 14 (more clearly shown in FIG. 6), and electromechanical circuitry (FIGS. 7–9) for controlling the cycling of the keyboard operation.

Figure 2:
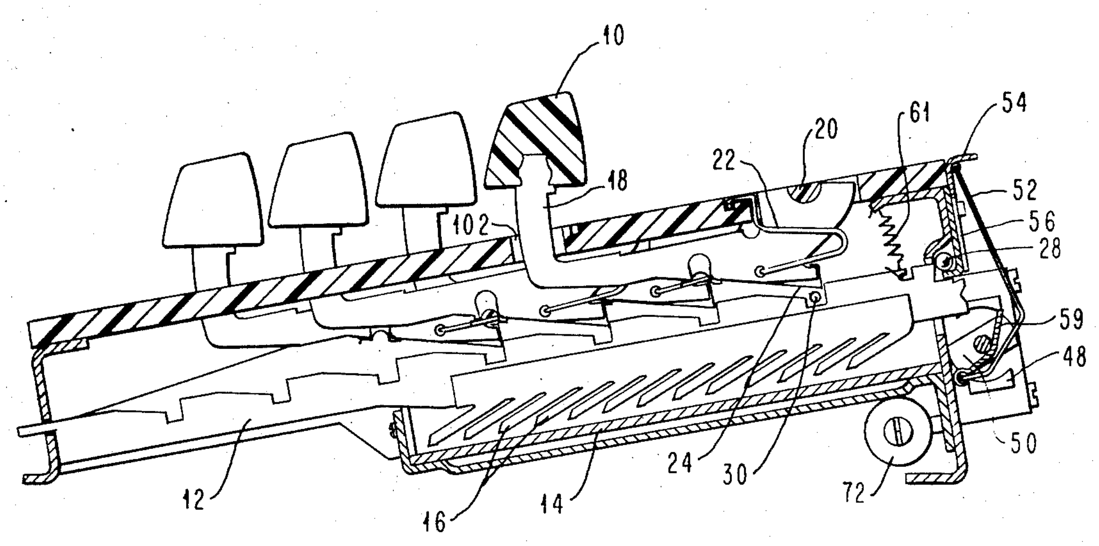
FIGS. 2–5 are a cross-section of the assembly of FIG. 1 illustrating the operation of the invention.

Referring to FIG. 2, depression of the key 10 initiates an action which causes the interposer and the conductive plastic fingers 16 attached thereto to be forced into contact with the coding card 14. Copper land areas on the card are connected to coding outputs in a permutation code pattern for each key of the keyboard. When the fingers contact the copper areas, a circuit is completed to the coding output at all positions which have copper areas connected to the output. This causes current to flow through the coding card in a pattern which is unique for the key depressed.

DETAILED DESCRIPTION

Figure 3:
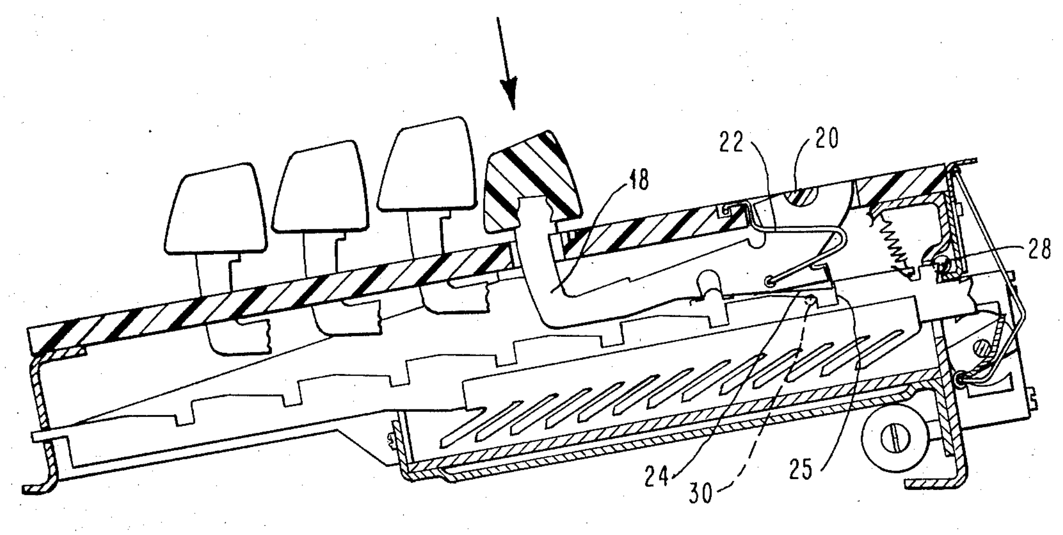

A cross section of the keyboard of FIG. 1 is shown in FIG. 2. When the operator depresses a key button 10, downward motion is translated into a horizontal motion (FIG. 3) by the key lever 18 which pivots on a fulcrum point 20. The key lever motion is resisted by a key lever return spring 22.

Figure 7:
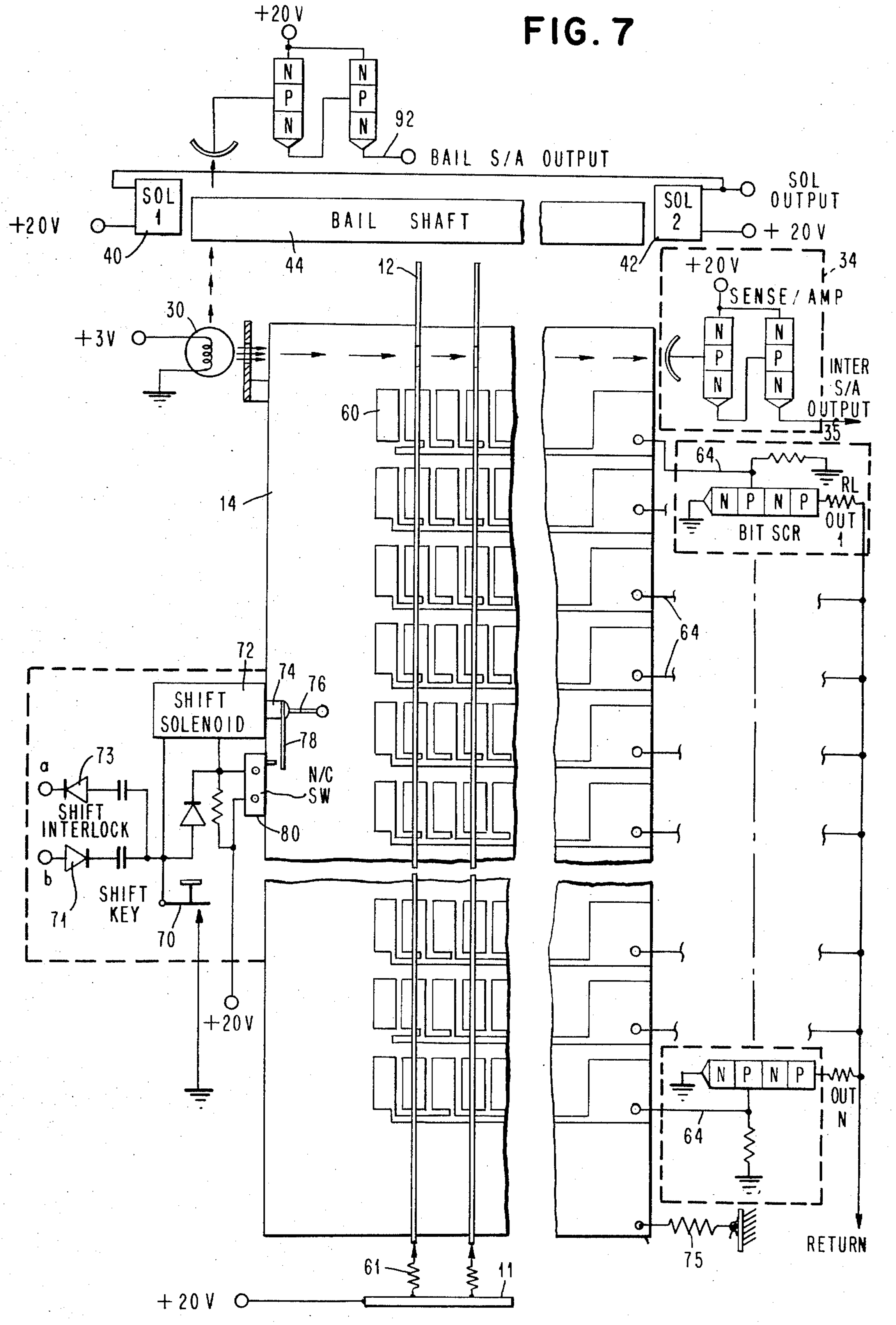
FIG. 7 is a schematic diagram of the electromechanical apparatus for operating the bail shaft assembly and the circuit card shift assembly.

The key lever/interposer spring 24 engages a slot 25 in the key interposer and moves the interposer into the ball interlock 28. The ball interlock allows only one interposer to enter. As the interposer enters the ball interlock, it cuts off the light from light source 30 which normally shines on interposer phototransistor 32 (FIG. 1) which is part of the interposer sense amplifier circuit 34 (FIG. 7). The interposer sense amplifier output triggers the bail shaft solenoid driver SCR1 or SCR1' (FIG. 8 or FIG. 9) which turns on for approximately 20 milliseconds, then switches off. This causes a current to flow to the bail shaft solenoid through output 36 (FIG. 8) or 38 (FIG. 9) depending upon whether the circuit is wired for dynamic or static mode, described more fully subsequently.

Figure 4:
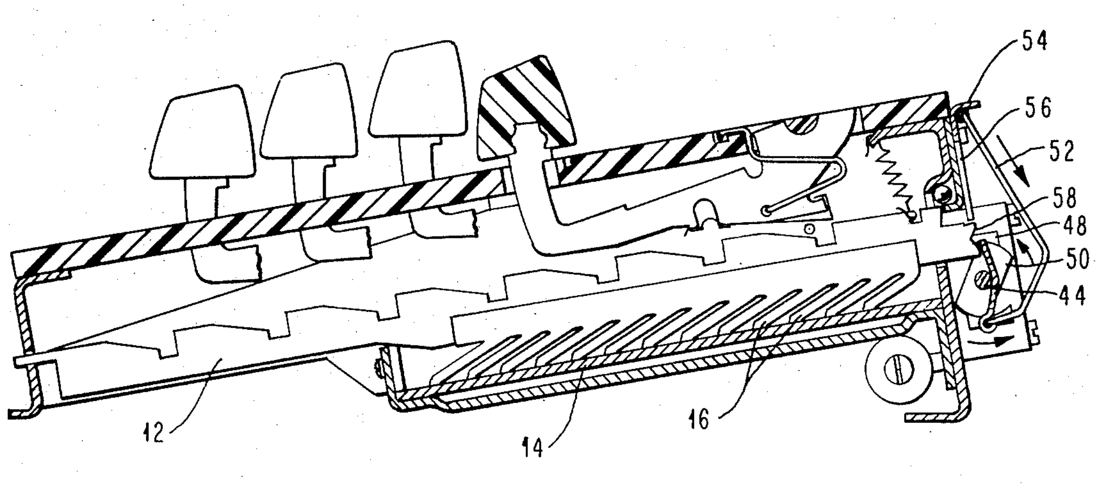

Referring to FIG. 4, when the bail shaft solenoids 40, 42 (FIG. 7) are energized, the bail shaft 44 rotates. When current passes through the solenoid coil, it causes a magnetic flux to flow in the solenoid stator 48. This causes the armature 50 connected to the bail shaft 44 to rotate counterclockwise. Maximum torque is applied to the armature the instant the magnetic flux flows. As the armature rotates it becomes more parallel to the lines of flux and the torque reduces to zero. As the bail rotates, it moves the pull-down linkage 52 which causes the pull-down 54 to move downward. The pull-down comb projection 56 engages the tip 58 of the interposer urging the interposer 12 downward out of the ball interlock towards the encoder card 14.

Figure 5:
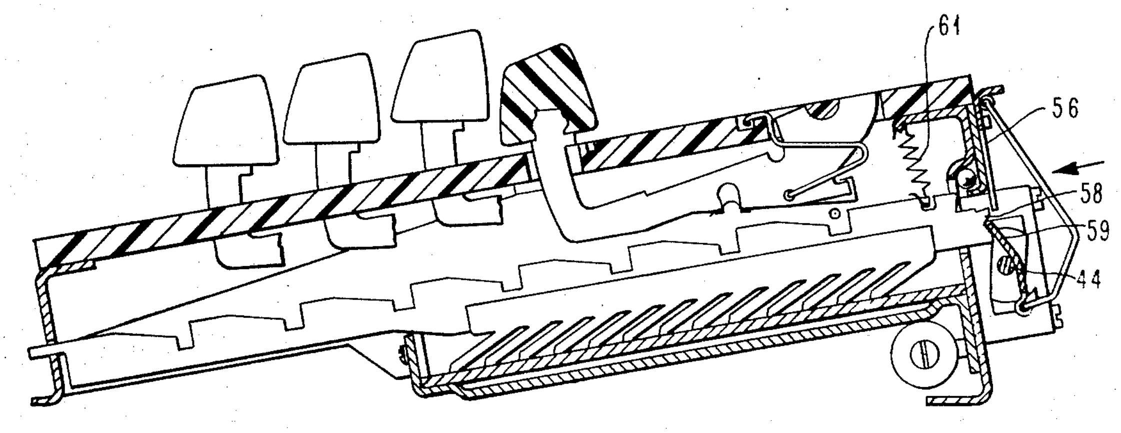

A set of contact fingers 16 are molded onto the interposer. The contact fingers are made of conductive polyvinyl chloride plastic, obtained in bulk from Abbey Plastics, Hudson, Massachusetts. A volume resistivity of 20 ohms per centimeter, and a Durometer of 90 to 100 hardness was specified. An injection mold was machined to the shape of the fingers. This mold was set up in a 7-ounce Model 175 Ankerwerk in-line, horizontal screw injection molding machine. Mold pressure, temperature and clamping forces were varied and the dimension and location of gating was chosen to yield a resistance per contact finger of approximately 7.5K ohms ±20 percent. The fingers 16 are molded at an angle to the encoding card. This angle is shown as 20°–30, but is not critical. As the interposer moves towards the encoding card 14, the contact fingers touch encoding lands on the card. The tip of the fingers are molded at a slight angle (for example, 3°) so that as the fingers approach the card surface 14, a small area of the fingers contact first increasing as the fingers flex until the downward travel is complete. Thus, the current which flows increases gradually. Further rotation (FIG. 5) of the bail shaft 44 causes the upper edge 59 of the bail to drive the interposer horizontally away from the ball interlock causing the contact fingers to wipe the encoding lands. The tip 58 of the interposer no longer contacts the pull-down projection 56, but is held down by the upper edge of the bail 44. The control circuitry at a predetermined time interrupts the current through the solenoid coils, and the pull-down and bail are returned to home position by pull-down return springs 63 (FIG. 1). The tip 58 of the interposer is free of the restraint imposed by the upper edge 59 of the bail and is returned to its rest position by interposer return spring 61. Should the key lever 18 still be depressed, the keylever/interposer spring 24 will yield to allow the interposer to return to rest.

Figure 6:
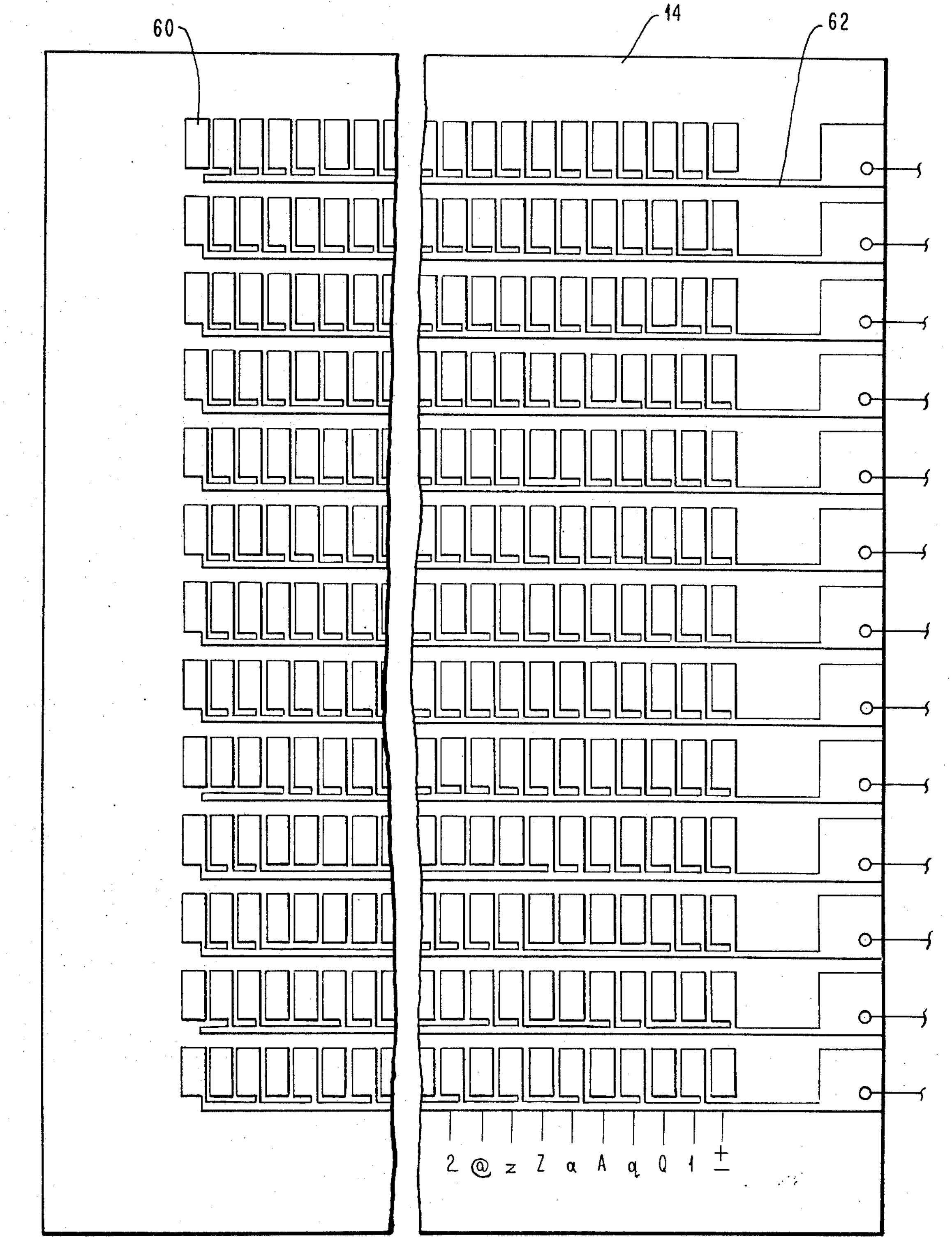
FIG. 6 is a drawing of the encoding card utilized in the apparatus of FIG. 1.

Referring to FIG. 6, the encoder is a printed circuit card 14 with encoding lands (copper areas) 60 and associated bit lines (parallel conducting paths) 62. The bit lines are soldered to SCR input lines 64. If the unique code for a position requires a 1 output, the encoding land is connected to the associated bit line. If the coding requires a 0 output, the encoding land is disconnected from the associated bit line. When the contact fingers touch the encoding lands, only selected 1 bit lines are energized since current will not flow to the 0 bit lines.

Alternatively, the interposer fingers may be selectively removed to provide the coding pattern.

UPPER AND LOWER CASE SHIFTING

Referring to FIG. 7, the encoding card 14 is normally positioned as shown to generate outputs for lower case symbols. Upper case symbols are generated by shifting the circuit card to the left to thereby bring a new set of encoding lands 60 under the respective interposers 12 to thereby generate the upper case symbol. More than two levels of shifting can be accomplished by moving the card an appropriate number of positions. Upper case shifting is accomplished by depressing the shift key 70 which causes current to flow through the shift solenoid 72. The armature 74 of the shift solenoid moves to the left and by means of linkage 76, which is attached to the card 14, causes the card to move to the left pulling against card return spring 75 which returns the card when the shift key 70 is released. A projection 78 on the shift solenoid armature actuates micro-switch 80 to insert resistance into the circuit so that solenoid "hold" current is less than solenoid "energize" current, preventing excessive power dissipation.

Shift interlock circuitry is provided to prevent inadvertent machine operation when a key is depressed while the circuit card 14 is being shifted. The shifting of the card 14 occurs whenever the shift key 70 is depressed (the card shifts to the left) or released (the card shifts to the right). In both of these cases, the shift interlock circuitry causes the keyboard to go through a no-code-output machine cycle during which the depression of one of the keyboard keys has no effect.

Figures 8, 9:
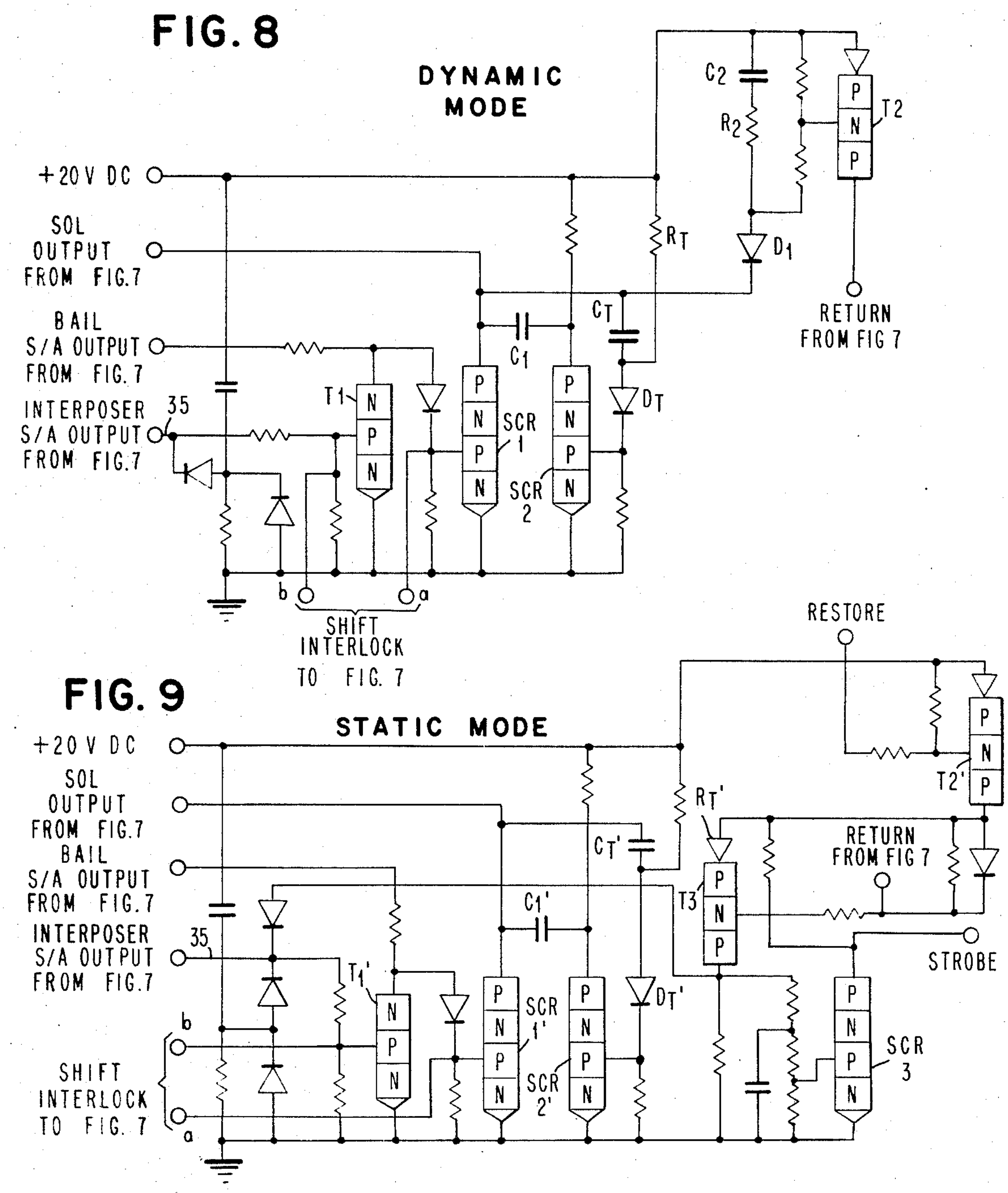
FIG. 8 is a schematic diagram of the electrical circuitry for operating in dynamic mode.
FIG. 9 is a block schematic diagram of the electrical circuitry for operating in static mode.

When the shift key 70 is depressed, diode 71 becomes forward biased and the shift interlock output b goes negative. Referring to FIG. 8, in the dynamic mode, this causes transistor T1 to be cut off thereby firing SCR1 causing the machine to go through a no-code-output cycle. Similarly, in the static mode, T1' is cut off and SCR1' is fired.

When the shift key 20 is opened (FIG. 7), diode 73 is forward biased and the shift interlock output a goes positive. This fires SCR1 in the dynamic mode to cause a no-code-output cycle and alternatively, in the static mode, causes SCR1' to fire.

DYNAMIC MODE OF OPERATION

In the dynamic mode, the encoded character is sent out as a set of parallel pulses, and the keyboard is restored internally a few milliseconds after the bits have been generated. Referring to FIG. 7, when the interposer 12 moves into the ball interlock it cuts off the light source 30 which normally shines on sense amplifier phototransistor 32 holding T1 "on." The interposer sense amplifier output 35 dropping toward ground, cuts "off" T1 allowing current from bail S/A to fire the silicon controlled rectifier SCR1 (FIG. 8). This energizes solenoids 1 and 2 shown in FIG. 7 through output 36. The bail shaft 44 (FIG. 7) begins turning causing the pull-down to engage the top of the interposer, pulling it down out of the ball interlock. The bail shaft 44 (FIG.

7) moves into position to block the light from light source 30 from falling on the phototransistor 90. This causes the output 92 of the bail sense amplifier to go negative.

The output from the interposer sense amplifier turns off transistor T1 which, in turn, allows the firing of SCR1. SCR1 stays on for approximately 20 milliseconds, then switches off. When the bail shaft solenoid is energized, the bail shaft rotates until it eventually reaches a position where the light source 30 is inhibited from shining on the phototransistor 90.

The frame 11 is connected to +20 volts. This places +20 volts on the interposer 12 through the points of contact with the frame and through interposer return spring 61. As the interposer 12 contacts the encoding area 60 on the board 14, approximately 2.6 V is impressed on outputs 64 in those positions at which a circuit is completed. This causes the gate of the bit SCR to go positive.

Initially transistor T1 is held in conduction by the output 35 of interposer sense amplifier 34. Therefore, the current supplied by the bail sense amplifier output is shunted through transistor T1 to ground. As the interposer moves into the ball interlock, the current supplied by the interposer sense amplifier is cut off and transistor T1 is taken out of conduction. The current which is normally shunted down through transistor T1 now passes down through the gate input of SCR1. Capacitor C1 contains a positive 20-volt charge. When SCR1 fires, the positive side of C1 is brought to ground and therefore, the anode of SCR2 is made negative turning SCR2 off. The timing capacitor CT also has a positive 20-volt charge. The positive side CT is brought to ground through the conduction of SCR1 and CT discharges through timing resistor RT. RT, changing the voltage on CT, causes a current to flow through diode DT bringing the base of SCR2 above ground so that SCR2 again fires completing the single shot action of the circuit.

If, for some reason, the bail shaft 44 (FIG. 7) has not returned to rest position, no current will be flowing through the bail sense amplifier output. Therefore, even though another key is depressed and transistor T1 is cut off, SCR1 will not fire because no current is being supplied by the bail sense amplifier output. Once the bail has returned to rest, a current will flow through the bail sense amplifier output to thereby fire SCR1 for another operating cycle.

The circuit parameters are chosen so that SCR1 remains on for about 20 milliseconds. As SCR1 fires it brings the cathode of diode D1 to ground thereby causing conduction through the input circuit of transistor T2 which now becomes forward biased and conducts. During the 20-millisecond range SCR1 is conducting capacitor C2 charges through resistor R2. Now when SCR1 is turned off at the end of 20 milliseconds, T2 is held on after SCR1 has turned off through the action of the charge on capacitor C2. The reason for C2 is to enable the interposer fingers to settle their travel on the encoding card before an output is obtained through the bit SCR's. Thus, the transistor T2 remains on for a period of time which is long enough to enable the feet on the interposers to settle. This time is determined by the combination of capacitor C2 and resistor R2. When T2 turns off, the current through all bit SCRs which have been "on," drops to zero and they turn off.

The shift interlock lines a and b (FIG. 8) are connected to the shift solenoid circuit on FIG. 7. As described previously, this interlock prevents inadvertent machine operation during a shift cycle by generating a no-code-output machine cycle.

STATIC MODE

Static mode is that mode in which any encoded character generated is maintained at the output until the utilization device energizes a restore input.

Referring to FIG. 9, when the interposer enters the ball interlock, a signal on interposer sense amplifier output 35 cuts transistor T1′ off causing SCR1′ to conduct. T2, being held in conduction by "restore" line connected to "ground" at utilization device, provides anode voltage to all bit SCRs. In the static mode, the bit SCRs (FIG. 7) remain on or fired maintaining the bit lines in the encoded position until T2′ is turned off by allowing "restore" line to float or go toward +20 V.

Any one of the output bit drivers turning on triggers the strobe SCR3. The strobe output is delayed so that when the strobe output is active, all the output bit lines have settled and are ready for sampling by the utilization device.

The restore signal is an input signal to the keyboard from the utilization device which resets the strobe and the output bit drivers.

SHIFT KEY FUNCTION

Referring to FIG. 7, shifting from lower case to upper case is accomplished by physically shifting the circuit card so that a new set of coding lands are placed under the interposers. The shift circuit operates as follows. Upon depression of the shift key 70, current flows through the shift solenoid 72 energizing the armature 74 which is pulled to the left. The armature is attached to the card by means of a connecting rod 76. As the armature moves to the left, it opens normally closed switch 80 which places a current limiting resistor in series with the shift solenoid. The card remains in this position as long as the shift key is depressed. As previously described, the shift interlock circuit is provided to prevent inadvertent operation of the keyboard during an operating cycle of the shift in either static or dynamic mode.

REPEAT KEY FUNCTION

Figure 10:
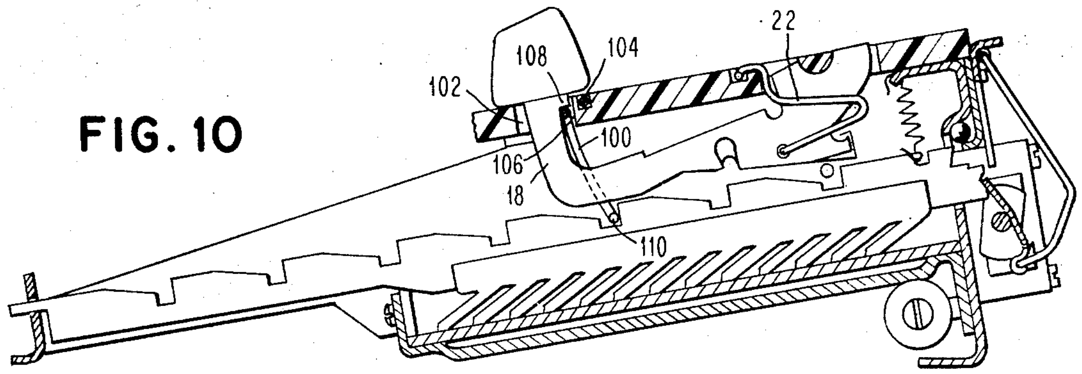
FIG. 10 is a cross-section of the assembly of FIG. 1 illustrating the repeat-key function.

Referring to FIG. 10, any key on the keyboard can be made a repeat key be adding a repeat key spring 100. Referring to FIG. 1, each key position is provided with a slot 102 to receive the key lever 18. When the repeat key spring is added to the slot, it is placed in a groove 104 such that a fulcrum point is provided against the post 106 as shown in FIG. 10. The upper part of the repeat key is formed in a loop which loops around the post in the groove. Now when the key is depressed with a force sufficient to cause the repeat function, the repeat step 108 forces down on the spring and places the spring under a bending moment with respect to the interposer slot 110. At the end of an operating cycle, when the interposer is released by return of the bail, the interposer is forced vertically by return spring 22 and horizontally by the repeat spring into the ball interlock. This causes a repeat of the operating cycle.

SUMMARY

Depression of a key lever results in the movement of a metal interposer into a ball interlock. The interposer cuts off a light source which fires a silicon controlled rectifier which energizes bail shaft solenoids. The solenoids rotate a bail shaft which actuates an interposer pull-down bail. The pull-down bail moves the selected interposer down free of the ball interlock. The rotation of the bail shaft moves the selected interposer back wiping plastic fingers across coded lands of a circuit card. A second key lever may be depressed any time after the ball interlock is cleared and will enter the ball interlock but will have no effect until the bail shaft and pull-down are restored because the bail shaft phototransistor will furnish SCR1 firing current at that time only.

Each interposer has a number of conductive plastic fingers which, when the interposer is in the depressed position, cause current to flow through a series of coded contacts to thereby selectively fire SCRs at each bit output.

The printed circuit card has bit lands extending the length of the card and terminating in bit SCR circuitry. The coding is provided by having bit land projections, as required by the code, at each interposer position. The conductive plastic fingers on the interposers complete the circuit to the bit SCRs through the bit land. Upper and lower case coding is provided by moving the card laterally such that a single interposer for each key lever contacts one of two coded bit land patterns, one for lower case and one for upper case.

While the invention has been shown and described with reference to preferred embodiments thereof, it will be understood by those skilled in the art that various changes in form and detail may be made therein without departing from the spirit and scope of the invention.

What is claimed is:

1. A keyboard comprising:

a plurality of interposers;

a ball interlock adapted to receive one of said interposers at a time;

a light source and a light responsive electrical circuit positioned so as to detect a change in position of one or more of said interposers;

a printed circuit card having a plurality of parallel conducting paths and conductive areas associated with said paths, each said path representing one bit of a permutation code;

means cooperative with said interposers providing flexible projecting fingers constructed of plastic conductive material, one of said fingers for each bit of said permutation code;

an interposer pull-down bail adapted to co-act with said one of said interposers entering said ball interlock;

a bail shaft in cooperative relationship with a solenoid motor circuit responsive to said light responsive circuit for energizing said bail shaft solenoid; and means responsive to rotation of said bail shaft for actuating said pull-down to thereby move said selected interposer free of said ball interlock and for urging said interposer and said flexible projecting fingers into cooperative relationship with said coded areas of said circuit card.

2. The combination according to claim 1 wherein said printed circuit card has bit lands extending the length of said card and terminating in bit silicon controlled rectifier circuitry and wherein coding is provided by having bit land projections as required by said code at each interposer position.

3. The combination according to claim 1 wherein upper and lower case coding is provided by moving said card laterally such that a single interposer for each key lever contacts one of two coded bit land patterns, one for lower case when said card is in one shifted position and one for upper case when said card is in another of said shifted positions.

4. A keyboard comprising:

a plurality of interposers;

a ball interlock adapted to receive one of said interposers at a time;

a light source and a light responsive electrical circuit positioned so as to detect a change in position of one or more of said interposers;

encoding means adapted to provide a permutation code output upon completion of electrical circuit therewith;

means cooperative with said interposers for providing electrical circuit completing means;

an interposer pull-down bail adapted to co-act with said one of said interposers entering said ball interlock;

a bail shaft in cooperative relationship with a solenoid motor circuit responsive to said light responsive circuit for energizing said bail shaft solenoid; and means responsive to rotation of said bail shaft for actuating said pull-down to thereby move said selected interposer free of said ball interlock and for urging said interposer and said electrical circuit completing means into cooperative relationship with said encoding means to thereby provide said permutation code output.

5. The combination according to claim 4 wherein said encoding means comprises a printed circuit card having a plurality of parallel conducting paths and conductive areas associated with said paths, each said path representing one bit of said permutation code; and said electrical circuit completion means comprises flexible projecting fingers constructed of plastic conductive material, one of said fingers for each bit of said permutation code.

6. A keyboard comprising:

a plurality of interposers;

a ball interlock adapted to receive one of said interposers at a time;

a key lever for urging said interposer into said ball interlock upon depression of a key on said keyboard;

a light source and a light responsive electrical circuit positioned so as to detect a change from a first position to a second position of one or more of said interposers;

a printed circuit card having a plurality of parallel conducting paths and conductive areas associated with said paths, each said path representing one bit of a permutation code;

means cooperative with said interposers providing flexible projecting fingers constructed of plastic conductive material, one of said fingers for each bit of said permutation code;

an interposer pull-down bail adapted to co-act with said one of said interposers entering said ball interlock;

a bail shaft in cooperative relationship with a solenoid motor circuit responsive to said light responsive circuit for energizing said bail shaft solenoid; and means responsive to rotation of said bail shaft for actuating said pull-down to thereby move said selected interposer free of said ball interlock and for urging said interposer and said flexible projecting fingers into cooperative relationship with said coded areas of said circuit card.

7. The combination according to claim 6 wherein said printed circuit card has bit lands extending the length of said card and terminating in bit silicon controlled rectifier circuitry and wherein coding is provided by having bit land projections as required by said code at each interposer position.

8. The combination according to claim 6 wherein upper and lower case coding is provided by moving said card laterally such that a single interposer for each key lever contacts one of two coded bit land patterns, one for lower case when said card is in one shifted position and one for upper case when said card is in another of said shifted positions.

9. The combination according to claim 6 including electrical circuit means for de-energizing said bail shaft solenoid after a predetermined time to thereby allow said interposer to return to said first position.

10. The combination according to claim 6 including means operable upon further depression of said key for repeatedly urging said interposer into said ball interlock to provide a repeat-key function.

11. A keyboard comprising:

encoding means adapted to provide a permutation code output upon completion of electrical circuit therewith;

an interposer provided with flexible projecting fingers constructed of conductive polyvinyl chloride material, and means responsive to depression of a key on said keyboard for urging said interposer and hence said fingers into contact with said encoding means to thereby complete said electrical circuit.

12. A keyboard comprising:

a printed circuit card having a plurality of parallel conducting paths, and conductive areas associated with said paths, each said path representing one bit of a permutation code;

a plurality of interposers, each one of which actuatable by a key on said keyboard; each said interposer provided with flexible projecting fingers constructed of conductive polyvinyl chloride material; and means responsive to depression of a key for urging said interposer and hence said fingers into contact with said conductive areas on said printed circuit card.

13. The combination according to claim 12 wherein selected ones of said areas are electrically connected to ones of said plurality of parallel conducting paths to thereby cause a circuit path to be completed between said interposer fingers and said parallel conducting paths in accordance with a permutation code unique to the key depressed.

14. The combination according to claim 12 wherein selected ones of said conductive fingers are prevented from making electrical contact with said conductive areas.

15. The combination according to claim 12 wherein said fingers are shaped so that as said fingers are urged into contact with said conductive areas on said printed circuit card a small area of the fingers contact first, increasing until the downward travel is complete to thereby cause a current to flow which increases gradually.

16. A keyboard comprising:

a printed circuit card having a plurality of parallel conducting paths, and conductive areas associated with said paths, each said path representing one bit of a permutation code;

a plurality of interposers each said interposer provided with flexible projecting fingers constructed of plastic material having conductive properties, one finger for each bit of said permutation code, said conductive fingers positioned at an angle to said conductive areas so that as said fingers are urged into contact with said conductive areas the areas are wiped by the flexing action of said fingers; and means for urging said interposer and hence said fingers into contact with said conductive areas on said printed circuit card.

17. The combination according to claim 16 wherein said fingers are constructed of conductive polyvinyl chloride.

18. The combination according to claim 16 wherein said fingers are shaped so that as said fingers are urged into contact with said conductive areas on said printed circuit card a small area of the fingers contact first, increasing until the downward travel is complete to thereby cause a current to flow which increases gradually.

19. A modular keyboard comprising:

a printed circuit card having a plurality of parallel conducting paths and conductive areas associated with said paths, each said path representing one bit of a permutation code;

a plurality of substantially identically shaped interposers, said interposers positioned orthogonally to said paths, each said interposer provided with flexible projecting fingers constructed of plastic conductive material, one said finger for each bit of said permutation code and adapted to contact corresponding ones of said conductive areas, said interposers adapted to be actuated by keyboard keys at any one of a plurality of points along the length of said interposer;

means responsive to depression of a key to initiate an action which causes the corresponding interposer and the conductive plastic fingers attached thereto to be forced into contact with selected one of said conductive areas on said coding card to thereby complete a circuit through the coding card in a pattern which is unique for the key depressed;

and means for shifting said coded card to thereby position a different set of coded areas in working relationship with said interposers to thereby provide upper and lower case shifting.

* * * * *